(12) United States Patent
Yi

(10) Patent No.: US 9,770,977 B2
(45) Date of Patent: Sep. 26, 2017

(54) FUEL TANK CAP WITH CHARCOAL CANISTER

(71) Applicant: CHONGQING FENGRUI PLASTIC Co., Ltd., Chongqing (CN)

(72) Inventor: Zhang Yi, Chongqing (CN)

(73) Assignee: CHONGQING FENGRUI PLASTIC Co., Ltd., Chongqing (CN)

(*) Notice: Subject to any disclaimer, the term of this patent is extended or adjusted under 35 U.S.C. 154(b) by 353 days.

(21) Appl. No.: 14/422,068

(22) PCT Filed: Dec. 8, 2014

(86) PCT No.: PCT/CN2014/093242
§ 371 (c)(1),
(2) Date: Feb. 17, 2015

(87) PCT Pub. No.: WO2016/033896
PCT Pub. Date: Mar. 10, 2016

(65) Prior Publication Data
US 2016/0272064 A1    Sep. 22, 2016

(30) Foreign Application Priority Data
Sep. 1, 2014  (CN) .......................... 2014 1 0441312

(51) Int. Cl.
*B01D 53/02*    (2006.01)
*B60K 15/04*    (2006.01)
(Continued)

(52) U.S. Cl.
CPC ...... *B60K 15/0406* (2013.01); *B01D 46/0036* (2013.01); *B01D 46/0041* (2013.01);
(Continued)

(58) Field of Classification Search
CPC ........ B01D 2253/102; B01D 2257/702; B01D 2257/708; B01D 2259/4516;
(Continued)

(56) References Cited

U.S. PATENT DOCUMENTS 8,096,438 B2    1/2012  Schmalz
2011/0290118 A1*  12/2011  Tanaka .................. B60K 15/04
                                                    96/139
(Continued)

FOREIGN PATENT DOCUMENTS

CN    202108629 U    1/2012
CN    202381202 U    8/2012
(Continued)

*Primary Examiner* — Christopher P Jones
(74) *Attorney, Agent, or Firm* — Andrew W. Chu; Craft Chu PLLC

(57) ABSTRACT

The fuel tank cap with a charcoal canister includes a fuel tank inner cap and a fuel tank outer cap. A filling room with an upper opening is disposed in the center of the fuel tank inner cap. The fuel tank outer cap is disposed above the fuel tank inner cap. The fuel-absorption substrate is filled in the filling room, and a containing room is disposed at the bottom of the filling room. The fuel vapor can be absorbed by the filled charcoal completely, and the little liquid fuel entering from the fuel tank can be stored by the containing room and recycled back to the fuel tank when the gasoline engine stops. The filtering performance of charcoal powder can be enhanced since it is exempted from long-time fuel soaking.

10 Claims, 5 Drawing Sheets

(51) Int. Cl.
*B01D 46/00* (2006.01)
*B01D 53/04* (2006.01)
*F02M 25/08* (2006.01)
*B60K 15/035* (2006.01)

(52) U.S. Cl.
CPC ..... *B01D 53/0415* (2013.01); *B01D 53/0446* (2013.01); *B60K 15/03504* (2013.01); *F02M 25/08* (2013.01); *B01D 2253/102* (2013.01); *B01D 2257/702* (2013.01); *B01D 2257/708* (2013.01); *B01D 2259/4516* (2013.01); *B01D 2259/4566* (2013.01); *B01D 2275/40* (2013.01); *B60K 2015/03514* (2013.01); *B60K 2015/03547* (2013.01)

(58) Field of Classification Search
CPC ........ B01D 2259/4566; B01D 2275/40; B01D 46/0036; B01D 46/0041; B01D 53/0415; B01D 53/0446; B60K 15/03504; B60K 15/0406; B60K 2015/03514; B60K 2015/03547; F02M 25/08
See application file for complete search history.

(56) References Cited

U.S. PATENT DOCUMENTS

| | | | | |
|---|---|---|---|---|
| 2013/0075396 | A1* | 3/2013 | Iwami | B60K 15/0406 220/203.28 |
| 2013/0341331 | A1* | 12/2013 | Bork | B60K 15/0406 220/560.03 |
| 2016/0243489 | A1* | 8/2016 | Yi | B01D 53/0423 |

FOREIGN PATENT DOCUMENTS

| | | |
|---|---|---|
| CN | 202970960 U | 6/2013 |
| CN | 204136770 U | 2/2015 |

* cited by examiner

FUEL TANK CAP WITH CHARCOAL CANISTER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a new kind of fuel tank cap with charcoal canister.

2. Description of Related Art Including Information Disclosed Under 37 CFR 1.97 and 37 CFR 1.98.

In the current market, generally, the containing room of the fuel tank cap is filled with charcoal powder. To achieve internal-external pressure balance, the fuel vapor of the fuel tank passes through the charcoal powder and gets filtered when the inner pressure of the fuel tank is higher than the outer pressure, thereby lessening environmental pollution. However not all fuel vapor can be absorbed by this way. When the inner temperature is too high, or there is too much vibration in the fuel tank, some liquid fuel will enter the containing room filled with charcoal powder, and determine the filtering performance of the charcoal powder by long time fuel soaking.

SUMMARY OF THE INVENTION

The present invention solves the technology problem by a new kind of fuel tank cap with a charcoal canister.

The invention solves the above problem by the technical solution as follows: a new kind of fuel tank cap with a charcoal canister comprises a fuel tank inner cap and a fuel tank outer cap. The filling room with an upper opening is disposed in the center of the fuel tank inner cap, and the first passageway is disposed at the bottom of the fuel tank inner cap. The outside of the fuel tank inner cap and the filling room are connected by the first passageway. The fuel tank outer cap covering the upper opening of the filling room is disposed above the fuel inner cap. The ventilating tube with the first breathing panel on it bottom is disposed inside of the fuel tank inner cap and overlapped to the outlet of the first passageway. The containing room is made up by the first breathing panel, the bottom of the fuel tank inner cap, and the interior wall of the fuel tank inner cap. The second passageway connecting its outlet with the containing room is disposed between the interior wall of the ventilating tube and the interior wall of the filling room. The fuel-absorption substrate filled in the filling room is disposed above the first breathing panel.

The invention has the advantage that the fuel vapor can be absorbed by the filled charcoal completely, and the little liquid fuel entering from the fuel tank can be stored by the containing room and recycled back to the fuel tank when the gasoline engine stops, thereby the charcoal powder can have a better filtering performance since it is exempted from long-time fuel soaking. The flow of liquid fuel/fuel vapor can be buffered by the breathing foam, and re-directed at a 180 degree turn by the ventilating tube before it enters the containing room. During the process, the flow of the fuel vapor is slowed down, and pressures are controlled somehow. The fuel vapor is dual-filtered by the first breathing panel before it enters the filling room, and the movement of the charcoal powder in the filling room is prevented from entering into the fuel tank to avoid blocking the carburetor.

DETAILED DESCRIPTION OF THE DRAWINGS

The following descriptions of the embodiment and their accompanying drawings of the present invention are intended to illustrate and not to limit this invention.

The First Embodiment

Figure 1:
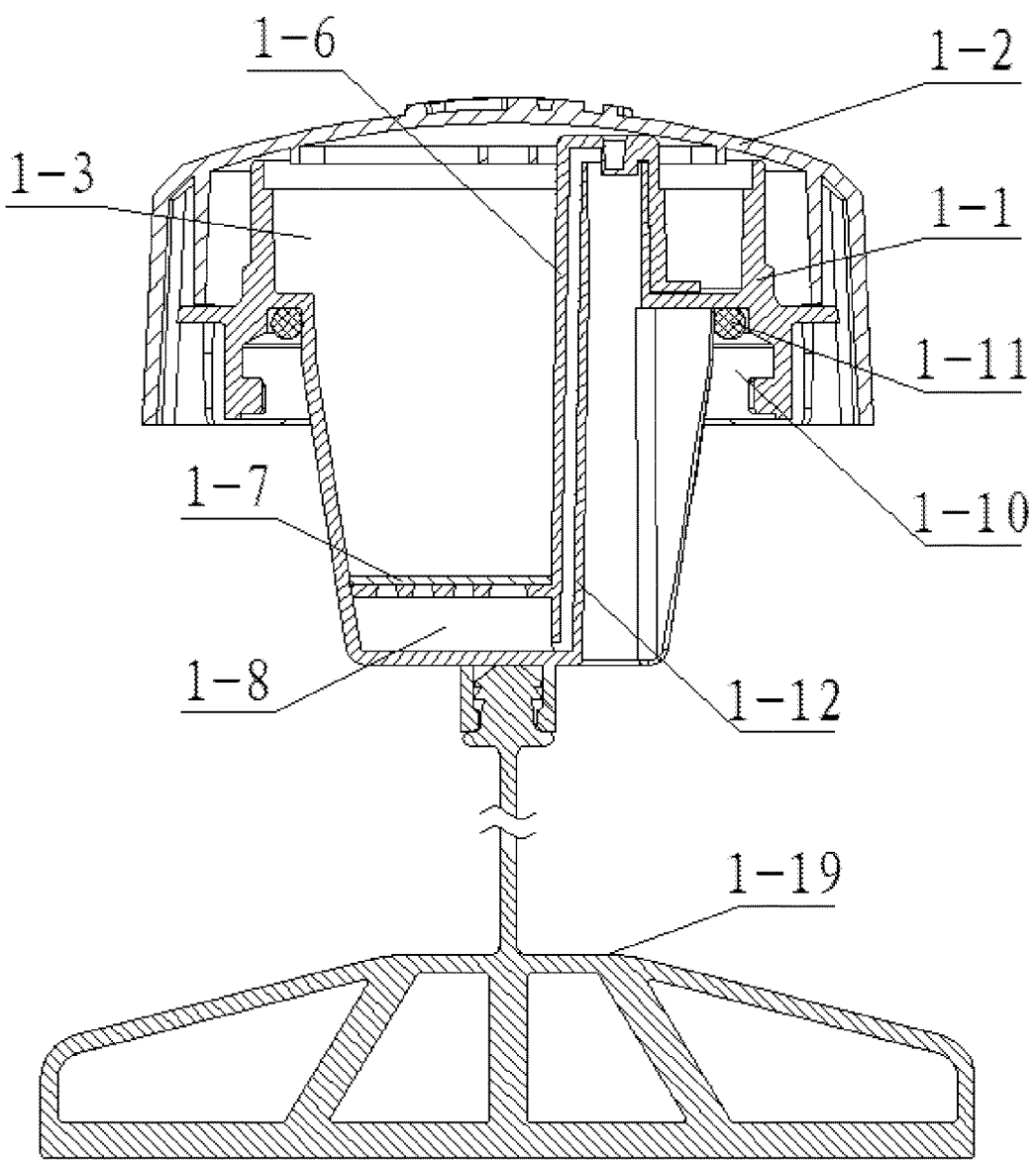
FIG. 1 is a cross-sectional view of the first embodiment of the present invention.
Figure 2:
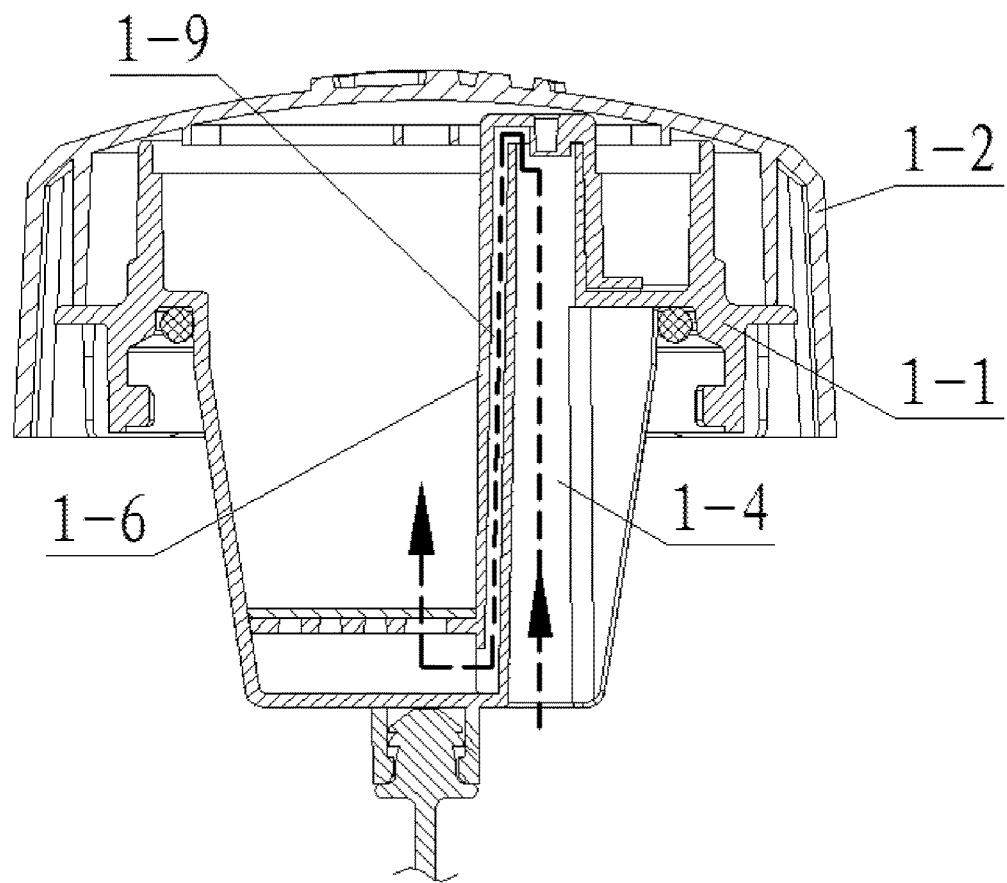
FIG. 2 is another cross-sectional view, showing the flow of liquid fuel/fuel vapor of the first embodiment of the present invention.
Figure 3:
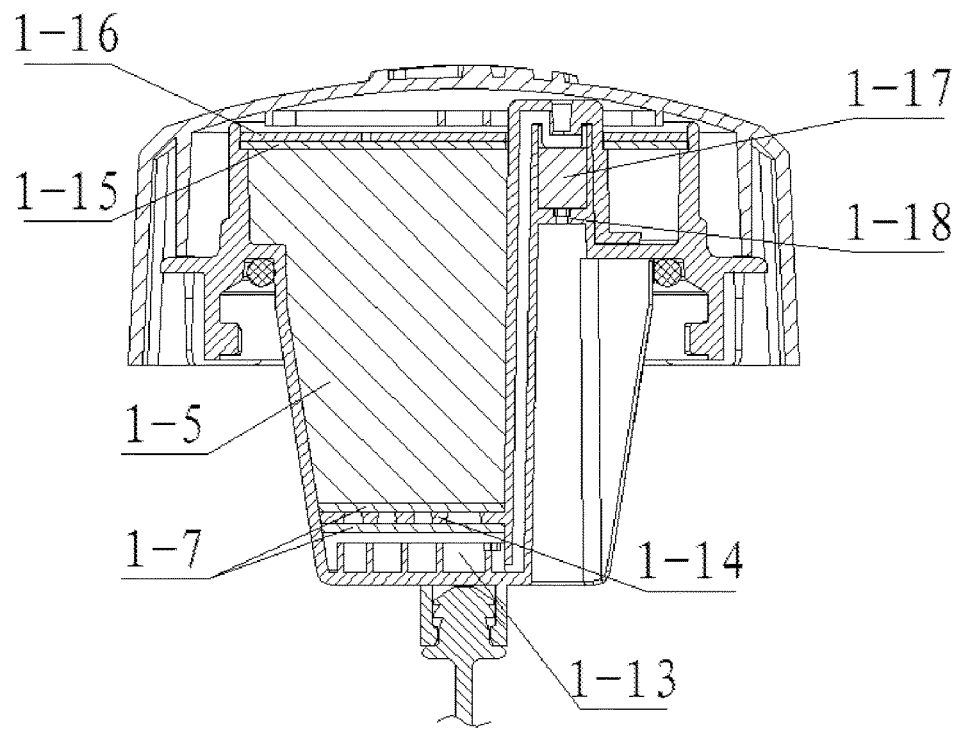
FIG. 3 is a cross-sectional view of the first embodiment with the fuel-absorption substrate of the present invention.

FIG. 1, FIG. 2, and FIG. 3 show the first embodiment of the present invention: a new kind of fuel tank cap with a charcoal canister comprises fuel tank inner cap 1-1, and fuel tank outer cap 1-2. The filling room 1-3 with an upper opening is disposed in the center of the fuel tank inner cap 1-1, and the first passageway 1-4 is disposed at the bottom of the fuel tank inner cap 1-1. The outside of the fuel tank inner cap 1-1 and the filling room 1-3 are connected by the first passageway 1-4. The volatilized fuel vapor is lead by the first passageway 1-4 to the filling room 1-3, then passes through the fuel-absorption substrate 1-5 in the filling room 1-3 to the atmosphere, thus achieving the goal of controlling emission, and reducing pollution. The fuel tank outer cap 1-2 covering the upper opening of said filling room 1-3 is disposed above the fuel inner cap 1-1, and the fuel tank outer cap 1-2 and fuel tank inner cap 1-1 are non-hermetically connected to make it is very easy to discharge the filtered fuel vapor to the atmosphere. The inside of the fuel tank outer cap 1-2 and the outside of the fuel tank inner cap 1-1 can be connected by clamping. The ventilating tube 1-6 with the first breathing panel on it bottom is disposed inside of said fuel tank inner cap 1-1 and overlapped to the outlet of said first passageway 1-4. The first breathing panel 1-7 of two-layer non-woven cloth is disposed at the bottom of the ventilating tube 1-6. The fuel vapor is dual-filtered by the first breathing panel before it enters the filling room 1-3. The movement of charcoal powder in the filling room 1-3 is prevented from entering into the fuel tank to avoid blocking carburetor. The containing room 1-8 is made up by the first breathing panel 1-7, the bottom of the fuel tank inner cap 1-1, and the interior wall of the fuel tank inner cap 1-1. The second passageway 1-9 connecting its outlet with the containing room 1-8 is disposed between the interior wall of the ventilating tube 1-6 and the interior wall of the filling room 1-3. The second passageway 1-9 functions to: (1) slow down the flow of fuel vapor in the first passageway 1-4 by changing its direction; (2) prolong the filtering time of the liquid fuel/fuel vapor in the fuel tank inner cap 1-1 for better absorption; and (3) lead fuel vapor to the containing room 1-8 to make room for little liquid fuel stored in the containing room 1-8. The fuel-absorption substrate 1-5 filled in the filling room 1-3 is disposed above the first breathing panel 1-7.

In embodiments, the slot 1-10 with the O-ring 1-11 is around the bottom of fuel tank inner cap 1-1, and used for fuel tank connection. The environmental pollution caused by the liquid fuel/fuel vapor non-filtered by the fuel-absorption substrate 1-5 in the filling room 1-3 can be reduced.

In embodiments, the protrusion 1-12 stands on the bottom of fuel tank inner cap 1-1, along with the interior wall of the filling room 1-3. In this embodiment, the protrusion 1-12 with the first passageway 1-4 inside stands on the bottom side of the fuel tank inner cap 1-1. The ventilating tube 1-6 is overlapped to the protrusion 1-12. The interior wall of the ventilating tube 1-6 and the outer wall of the protrusion 1-12 consist of the second passageway 1-9. In this embodiment, the interior wall of the ventilating tube 1-6 and the outer wall of the protrusion 1-12 are required to be hermetically connected. Since the protrusion 1-12 is at the bottom side of the fuel tank inner cap 1-1, and the bottom outlet of the ventilating tube 1-6 is completely inside of the containing room 1-8, then little fuel vapor can only enter the containing room 1-8, but not the filling room 1-3 directly.

In embodiments, the grid panel 1-13 is disposed on the bottom of the containing room 1-8. There is some interstice between the upper surface of the grid panel 1-13 and the bottom surface of the first breathing panel 1-7.

In embodiments, the supporting panel 1-14 is under the first breathing panel 1-7 and above the second passageway 1-9, and the bottom outlet of the second passageway 1-9 is inside of the containing room 1-8. A plurality of pores is disposed on the supporting panel 1-14. The supporting panel 1-14 is fixed with the outer wall of the ventilating tube 1-6. Preferably, the supporting panel 1-14 and the ventilating tube 1-6 can be integrated molded. One or more the first breathing panels 1-7 can be disposed under the supporting panel 1-14, and between the bottom surface of the supporting panel 1-14 and the upper surface of the grid panel 1-13.

In embodiments, the second breathing panel 1-15 of two-layer non-woven cloth covering the fuel-absorption substrate 1-5 is disposed above the upper opening of the filling room 1-3 to prevent the leakage of fuel-absorption substrate 1-5. Preferably, the surrounding platform embedding the second breathing panel 1-15 is disposed around the upper opening of the filling room 1-3, the protrusion 1-12 pushing the second breathing panel 1-15 downwards is disposed at the bottom of the fuel tank outer cap 12, and the surrounding platform supporting the second breathing panel 1-15 is disposed on said ventilating tube 1-6. The separating panel 1-16 is disposed above the second breathing panel 1-15, and between the fuel tank outer cap 1-2 and the second breathing panel 1-15, thereby the second breathing panel 1-15 can be pressed to prevent the leakage of the fuel-absorption substrate 1-5.

In embodiments, the breathing foam 1-17 is disposed within the protrusion 1-12, and on the way of the second passageway 1-9. The flow of fuel vapor can be slowed down. The separating panel 1-18 is disposed on the way of second passageway 1-9, and the breathing foam 2-17 can be disposed either above or under of the separating panel 1-18. In this embodiment, it is disposed above of the separating panel 1-18.

In embodiments, the fuel-absorption substrate 1-5 is activated charcoal.

In embodiments, the anti-drop chain 1-19 is disposed and clamping connected with the bottom of the fuel tank inner cap 1-1.

The Second Embodiment

Figure 4:
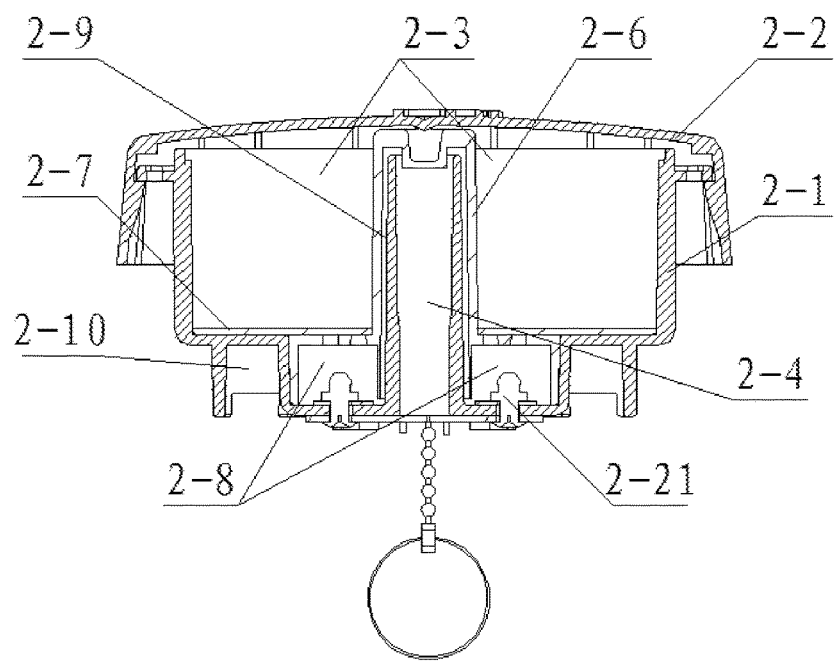
FIG. 4 is a cross-sectional view of the second embodiment of the present invention.
Figure 5:
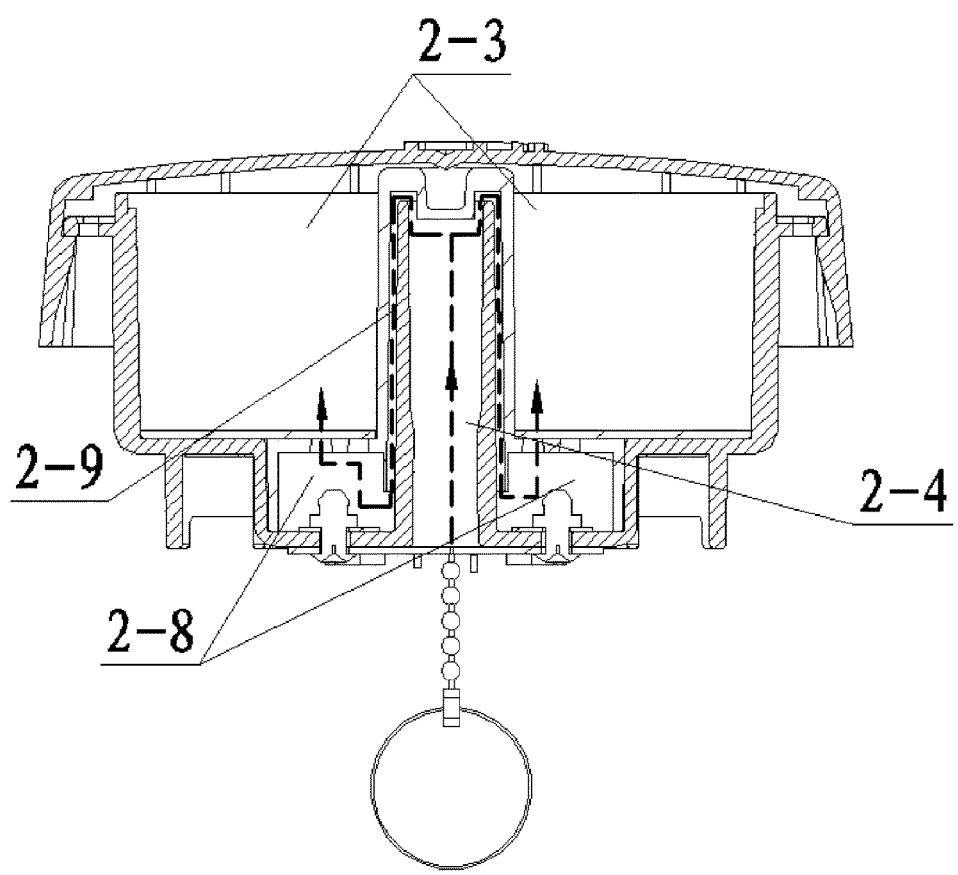
FIG. 5 is another cross-sectional view, showing the flow of liquid fuel/fuel vapor of the second embodiment of the present invention.
Figure 6:
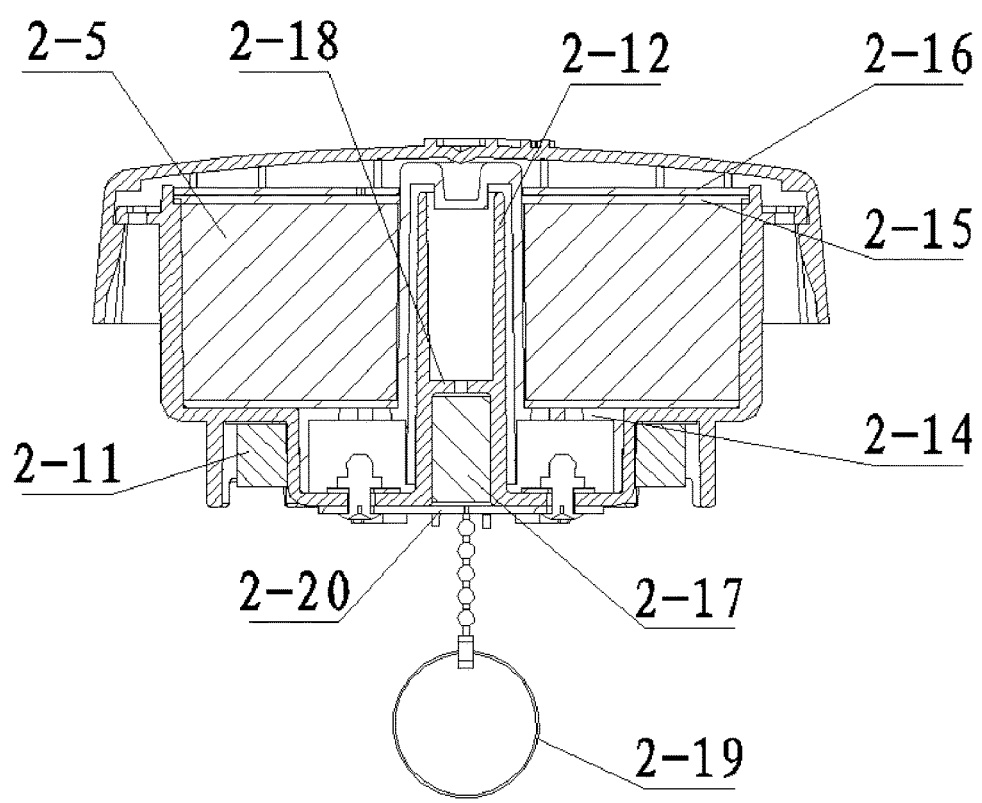
FIG. 6 is a cross-sectional view of the second embodiment with the fuel-absorption substrate of the present invention.

FIG. 4, FIG. 5, and FIG. 6 show the second embodiment of the present invention: a new kind of fuel tank cap with a charcoal canister comprises a fuel tank inner cap 2-1, and a fuel tank outer cap 2-2. The filling room 2-3 with an upper opening is disposed in the center of the fuel tank inner cap 2-1, and the first passageway 2-4 is disposed at the bottom of the fuel tank inner cap 2-1. The outside of the fuel tank inner cap 2-1 and the filling room 2-3 are connected by the first passageway 2-4. The volatilized fuel vapor is lead by the first passageway 2-4 to the filling room 2-3, then passes through the fuel-absorption substrate 2-5 in the filling room 2-3 to the atmosphere, thus achieving the goal of controlling emission, and reducing pollution. The fuel tank outer cap 2-2 covering the upper opening of said filling room 2-3 is disposed above the fuel inner cap 2-1, and the fuel tank outer cap 2-2 and fuel tank inner cap 2-1 are non-hermetically connected to make it very easy to discharge the filtered fuel vapor to the atmosphere. The inside of the tank outer cap 2-2 and the outside of the fuel tank inner cap 2-1 can be connected by clamping. The ventilating tube 2-6 is disposed inside of the fuel tank inner cap 2-1 and overlapped to the outlet of said first passageway 2-4. The first breathing panel 2-7 of two-layer non-woven cloth is disposed at the bottom of the ventilating tube 2-6. The fuel vapor is dual-filtered by the first breathing panel 2-7 before it enters the filling room 2-3. The movement of charcoal powder in the filling room 2-3 is prevented from entering into the fuel tank to avoid blocking carburetor. The containing room 2-8 is made up by the first breathing panel 2-7, the bottom of the fuel tank inner cap 2-1, and the interior wall of the fuel tank inner cap 2-1. The second passageway 2-9 connecting its outlet with the containing room 2-8 is disposed between the interior wall of the ventilating tube 2-6 and the interior wall of the filling room 2-3. The second passageway 2-9 functions to: (1) slow down the flow of fuel vapor in the first passageway 2-4 by changing its direction; (2) prolong the filtering time of the fuel vapor in the tank inner cap 2-1 for better absorption; and (3) lead fuel vapor to the containing room 2-8 to make room for little liquid fuel stored in the containing room 2-8. The fuel-absorption substrate 2-5 filled in said filling room 2-3 is disposed above the first breathing panel 2-7.

In embodiments, the slot 2-10 with the O-ring 2-11 is around the bottom of fuel tank inner cap 2-1, and used for fuel tank connection. The pollution caused by the fuel vapor non-filtered by the fuel-absorption substrate 2-5 in the filling room 2-3 can be reduced.

In embodiments, the protrusion 2-12 stands on the bottom of fuel tank inner cap 2-1, along with the interior wall of the filling room 2-3. In this embodiment, the protrusion 2-12 is disposed on the bottom of the fuel tank inner cap 2-1. Preferably, the protrusion 2-12 with the second passageway 2-4 inside is disposed on the bottom center of the fuel tank inner cap 2-1. The ventilating tube 1-6 is overlapped to the protrusion 2-12, and the interior wall of the ventilating tube 2-6 and the outer wall of the protrusion 2-12 consist of the second passageway 2-9. In this embodiment, the interior wall of the ventilating tube 2-6 and the outer wall of the protrusion 2-12 are not required to be hermetically connected. Since the protrusion 2-12 is overlapped by the ventilating tube 2-6 completely, and the bottom outlet of the ventilating tube 2-6 is completely inside of the containing room 2-8, then all fuel vapor can enter the containing room 2-8.

In embodiments, the supporting panel 2-14 is disposed under the first breathing panel 2-7 and above the second passageway 2-9, thereby the bottom outlet of the second passageway 2-9 is inside of the containing room 2-8. A plurality of pores is disposed on the supporting panel 2-14. Through the first breathing panel 2-7, the fuel vapor enters the filling room 2-3. The supporting panel 2-14 is fixed with the outer wall of the ventilating tube 2-6. Preferably, the supporting panel 2-14 and the ventilating tube 2-6 can be integrated molded; the supporting panel 2-14 can be round-shaped, further, cylinder shaped, whereof the height of the cylinder is same as the depth of the containing room 2-8, to insert into the containing room 2-8. The upper surface of the supporting panel 2-14 (also the upper surface of the round) is at the same level of the bottom surface of the filling room 2-3, thereby the first breathing panel 2-7 can be laid down evenly (Preferably, the first breathing panel 2-7 covers both the upper opening of the containing room 2-8 and the bottom surface of the filling room 2-3.).

In embodiments, the second breathing panel 2-15 of two-layer non-woven cloth covering the fuel-absorption substrate 2-5 is disposed above the upper opening of the filling room 2-3 to prevent the leakage of the fuel-absorption substrate 2-5. Preferably, the surrounding platform embedding the second breathing panel 2-15 is disposed around the upper opening of the filling room 2-3, the protrusion 2-12 pushing the second breathing panel 2-15 downwards is disposed at the bottom of the fuel tank outer cap 2-2, and the surrounding platform supporting the second breathing panel 2-15 is disposed on the ventilating tube 2-6. The upper end of the ventilating tube 2-6 can either or not pass through the second breathing panel 2-15. In this embodiment, the ventilating tube 2-6 passes through the second breathing 2-15 till the bottom of the fuel tank outer cap 2-2, thereby the ventilating tube 2-6 can support both the second breathing panel 2-1 and the fuel tank outer cap 2-2. The separating panel 2-16 is disposed above the second breathing panel 2-15, and between the fuel tank outer cap 2-2 and the second breathing panel 2-15, thereby the second breathing panel 2-15 can be pressed to prevent the leakage of the fuel-absorption substrate 2-5.

In embodiments, the breathing foam 2-17 is disposed within the protrusion 2-12, and on the way of the second passageway 2-9. The flow of fuel vapor can be slowed down. The separating panel 2-18 is disposed on the way of the second passageway 2-9, and the breathing foam 2-17 can be disposed either above or under of the separating panel 2-18. In this embodiment, it is disposed on above the separating panel 2-18, and the special metal pad 2-20 is disposed on the inlet of the second passageway 2-9 to avoid the falling of the breathing foam 2-17.

In embodiments, the special metal pad 2-20 is connected with the bottom of the containing room 2-8 by the stainless steel rivet 2-21. The stainless steel rivet 2-21 passes through the bottom of the containing room 2-8 with its upper end inside of the containing room 2-8. The stainless steel rivet 2-21 functions to not only connect the containing room 2-8, but also discharge the deposited liquid fuel in the containing room 2-8.

In embodiments, a plurality of round metal pads is disposed on the bottom of the containing room 2-8. It can not only enhance the connection of the stainless steel rivet 2-21 with the bottom of the containing room 2-8, but also avoid the falling of the stainless steel rivet 2-21.

In embodiments, the fuel-absorption substrate 2-5 is activated charcoal.

In embodiment, the anti-drop chain 2-19 is disposed and connected with the bottom of the tank inner cap 2-1.

When positive pressure or negative pressure occur in the fuel tank, the experimental data about the flow in every minute of the liquid fuel entering into the containing room (1-8; 2-8) and little liquid fuel recycled from the containing room (1-8; 2-8) to the fuel tank is as the following:

Positive/Negative Pressure & Flow Record 1 Of the Vertical Shaft Fuel Tank Cap with Charcoal Canister Positive/Negative Pressure Unit: Kpa, Flow Unit: L/Min Sheet 1

| | Positive Pressure | | | | | | | | | |
|---|---|---|---|---|---|---|---|---|---|---|
| | 1.0 | 2.0 | 3.0 | 4.0 | 5.0 | 6.0 | 7.0 | 8.0 | 9.0 | 10.0 |
| Flow | 0 | 1.23 | 2.29 | 3.00 | 3.54 | 4.10 | 4.48 | 4.85 | 5.24 | 5.67 |
| | Negative Pressure | | | | | | | | | |
| | −2.0 | −2.5 | −3.0 | −3.5 | −4.0 | −4.5 | −5.0 | −5.5 | −6.0 | −6.5 |
| Flow | 1.78 | 2.13 | 2.47 | 2.63 | 2.86 | 3.04 | 3.24 | 3.38 | 3.55 | 3.74 |

Positive/Negative Pressure & Flow Record 2 of the Vertical Shaft Fuel Tank Cap with Charcoal Canister Positive/Negative Pressure Unit: Kpa, Flow Unit: L/Min Sheet 2

| | Positive Pressure | | | | | | | | | |
|---|---|---|---|---|---|---|---|---|---|---|
| | 1.0 | 2.0 | 3.0 | 4.0 | 5.0 | 6.0 | 7.0 | 8.0 | 9.0 | 10.0 |
| Flow | 0.07 | 1.67 | 2.75 | 3.39 | 3.82 | 4.19 | 4.72 | 5.16 | 5.40 | 5.81 |

-continued

| Negative Pressure | | | | | | | | | |
|---|---|---|---|---|---|---|---|---|---|
| −2.0 | −2.5 | −3.0 | −3.5 | −4.0 | −4.5 | −5.0 | −5.5 | −6.0 | −6.5 |
| Flow 2.47 | 2.86 | 3.13 | 3.43 | 3.72 | 4.04 | 4.20 | 4.68 | 4.75 | 4.96 |

Note:
Vertical and horizontal shaft refer to the installation of the engine.

The above-described preferred embodiments of the present invention is not intended to limit the present invention, any modification within the spirit and principles of the present invention, made by the equivalent replacement, improvement, etc., should be included in the protection of the present invention within the range.

I claim:

1. A fuel tank cap, comprising:
a fuel tank inner cap; and
a fuel tank outer cap,
wherein a filling room with an upper opening is disposed in a center of said fuel tank inner cap,
wherein a first passageway is disposed at a bottom of said fuel tank inner cap,
wherein an outside of said fuel tank inner cap and said filling room are connected by said first passageway,
wherein said fuel tank outer cap covers said upper opening of said filling room and is disposed above said fuel tank inner cap,
wherein a ventilating tube with a first breathing panel on a bottom of said ventilating tube is disposed inside of said fuel tank inner cap and overlaps an outlet of said first passageway,
wherein a containing room is comprised of said first breathing panel, said bottom of said fuel tank inner cap, and an interior wall of said fuel tank inner cap,
wherein a second passageway, connecting an outlet of said second passageway with said containing room, is disposed between an interior wall of said ventilating tube and an interior wall of said filling room, and
wherein a fuel-absorption substrate filled in said filling room is disposed above said first breathing panel.

2. The fuel tank cap, according to claim 1, further comprising:
an upwardly-extending protrusion towards said filling room is disposed at the bottom of said fuel tank inner cap,
wherein said first passageway passes by said protrusion, and
wherein said second passageway is comprised of said interior wall of said ventilating tube, said interior wall of said ventilating tube overlapping said protrusion, and an outer wall of said protrusion.

3. The fuel tank cap, according to claim 2, wherein, through said containing room surrounding said protrusion, said protrusion is disposed at the bottom of said fuel tank inner cap, and inside of said filling room, and
wherein a bottom end of said ventilating tube is disposed inside of said containing room.

4. The fuel tank cap, according to claim 3, further comprising:
a plurality of stainless steel rivets disposed all over a bottom of said containing room at said bottom of said fuel tank inner cap.

5. The fuel tank cap, according to claim 2, wherein said protrusion is disposed at said bottom of said fuel tank inner cap, said containing room being on a bottom side of said protrusion, and
wherein a part of a bottom end of said ventilating tube is inside of said containing room.

6. The fuel tank cap, according to claim 5, wherein an interior wall of said ventilating tube and said outer wall of said protrusion are hermetically connected.

7. The fuel tank cap, according to claim 2, further comprising:
a breathing foam disposed inside of said protrusion between said first passageway and said second passageway.

8. The fuel tank cap, according to claim 1, further comprising:
a supporting panel with a plurality of orifices disposed at the bottom of said first breathing panel, wherein said supporting panel and the outer wall of said ventilating tube are fixed together.

9. The fuel tank cap, according to claim 1, further comprising:
a second breathing panel covering said fuel-absorption substrate and being disposed above an upper opening of said filling room.

10. The fuel tank cap, according to claim 9, further comprising:
a surrounding platform embedding said second breathing panel and being disposed around said upper opening of said filling room, and
a protrusion pushing said second breathing panel downwards and being disposed at said bottom of said fuel tank outer cap,
wherein said surrounding platform is disposed on said ventilating tube.

* * * * *